March 19, 1940. F. DRUMM 2,194,297
POWER DRIVEN WORK DEVICE
Filed Feb. 18, 1937. 5 Sheets-Sheet 3

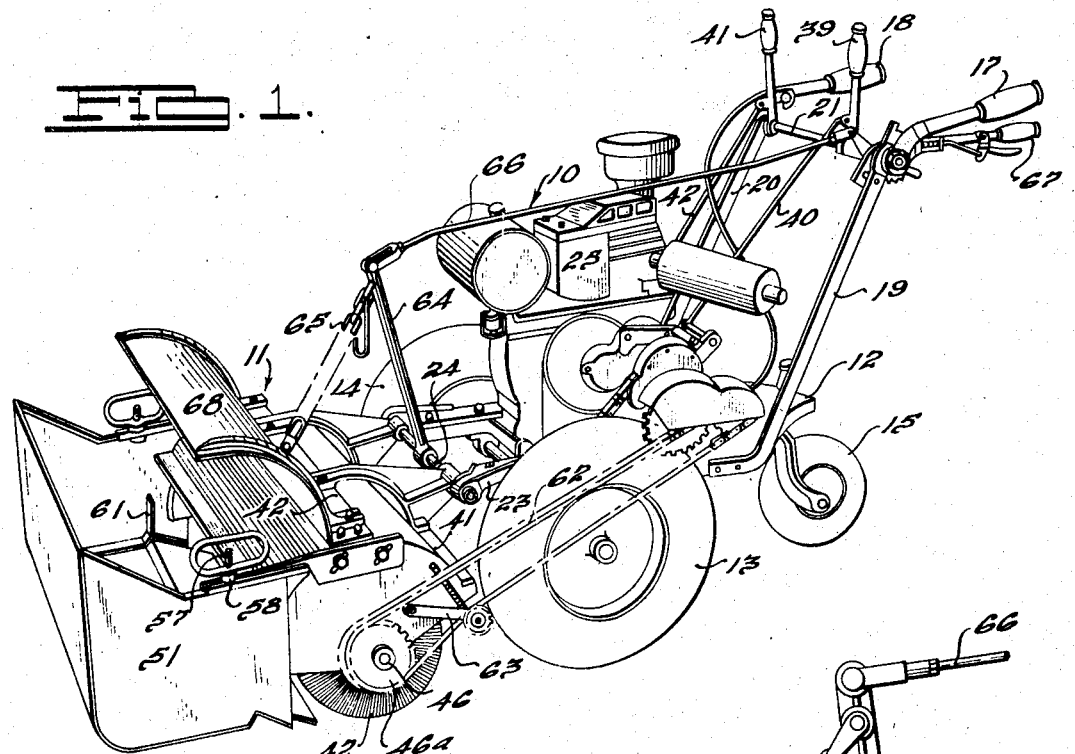
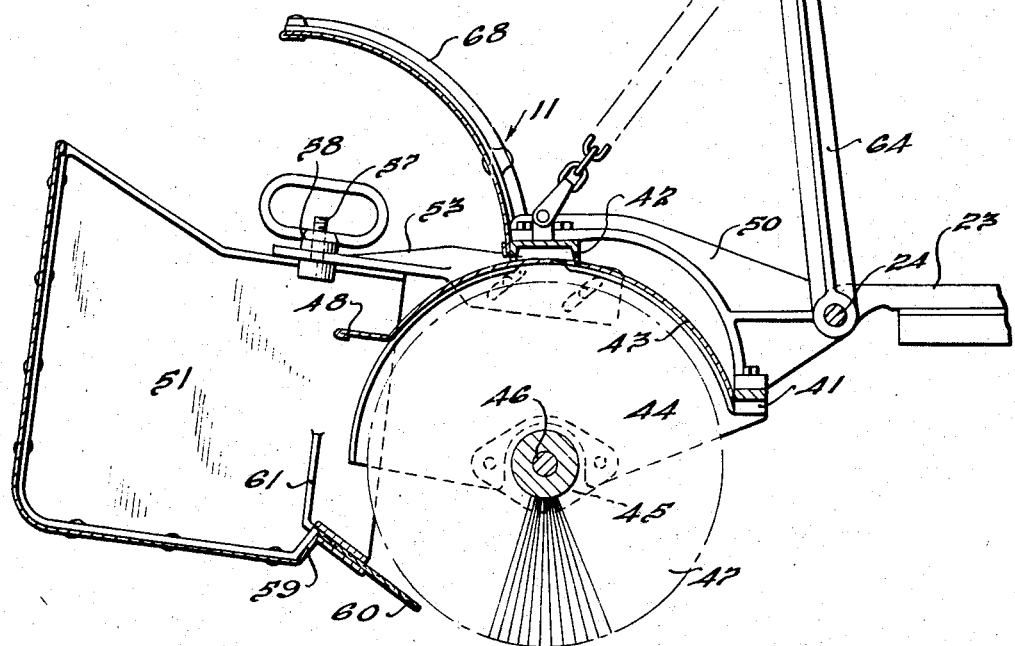

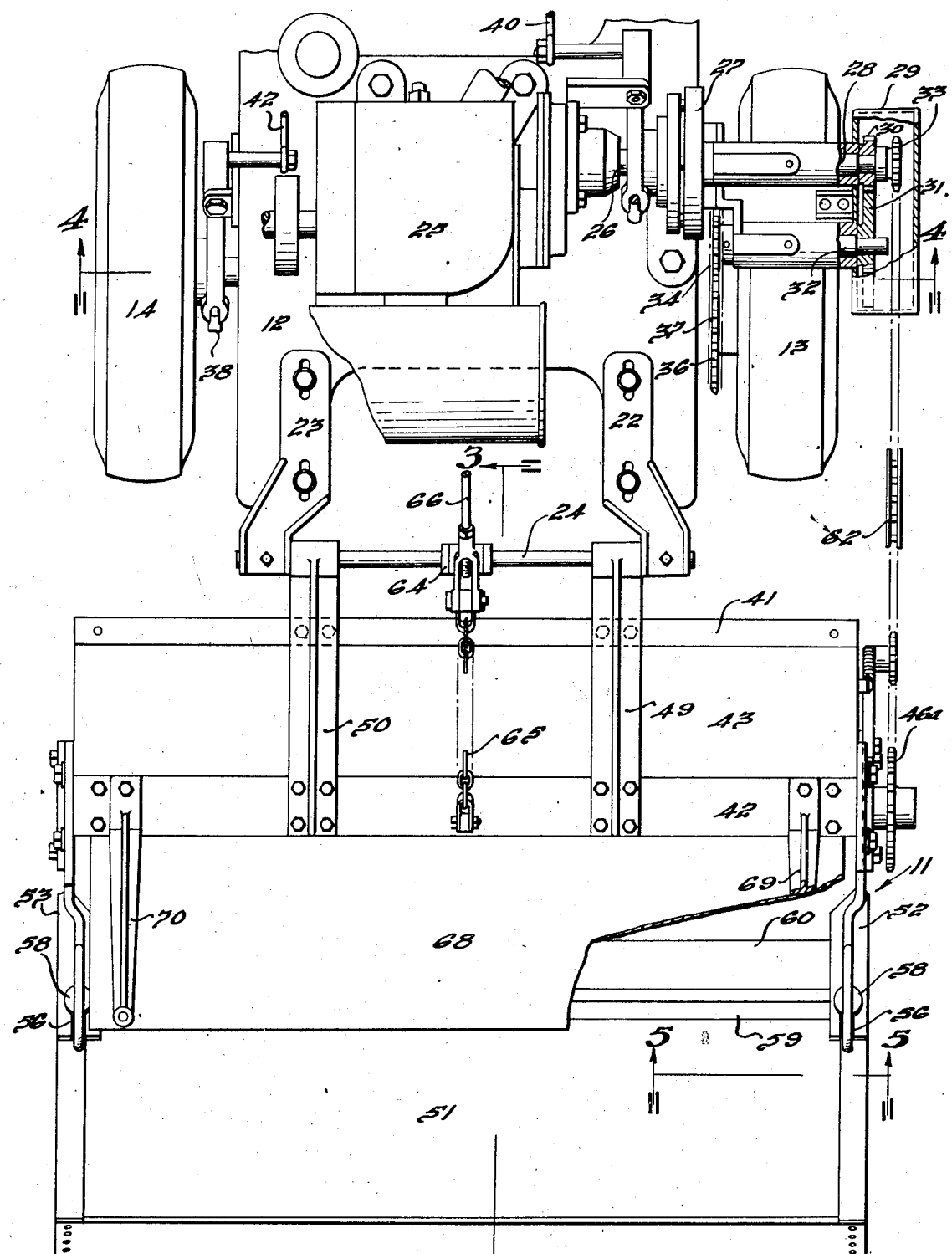

INVENTOR
Floyd Drumm.
BY
Carroll R. Taber
ATTORNEY

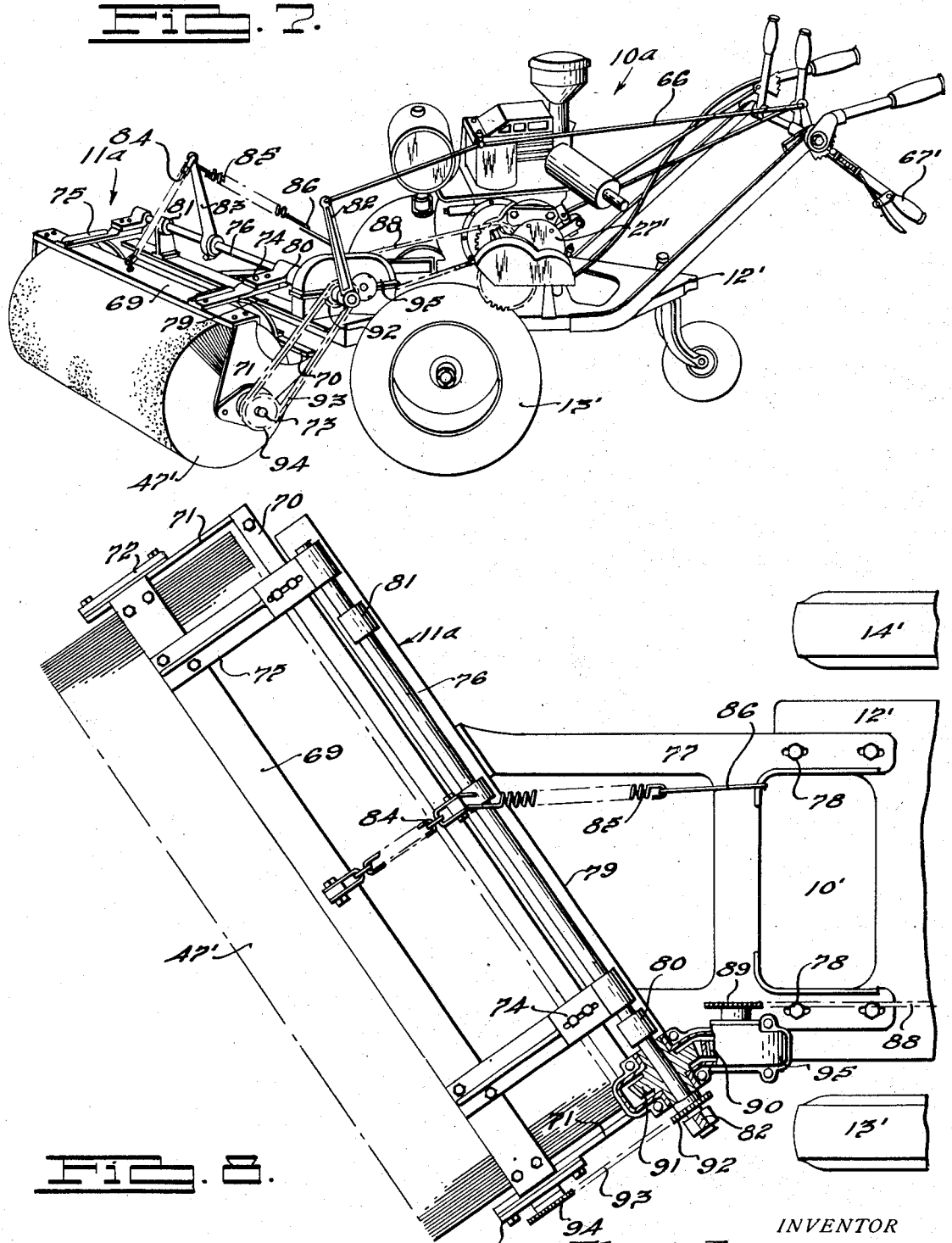

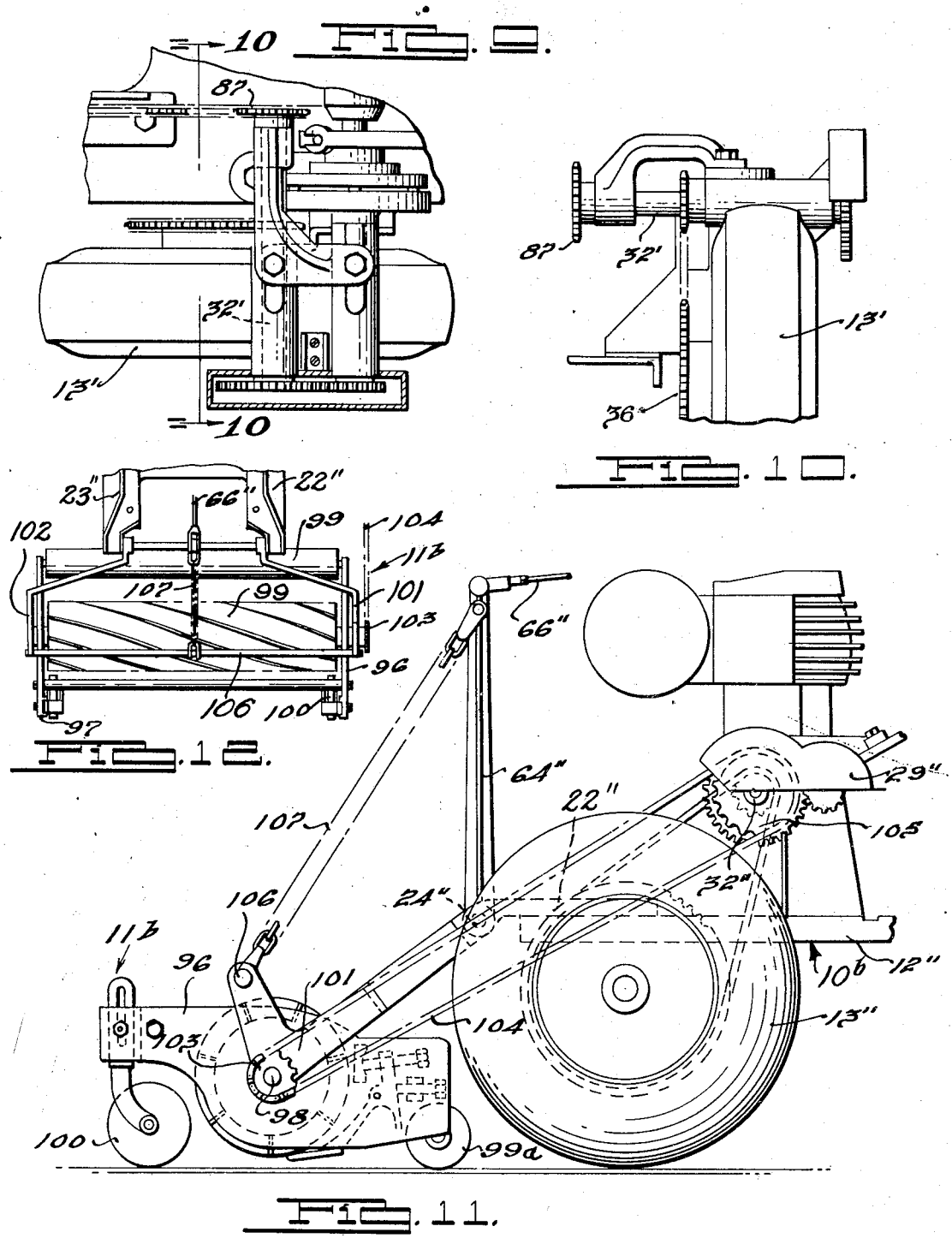

Patented Mar. 19, 1940

2,194,297

UNITED STATES PATENT OFFICE 2,194,297

POWER DRIVEN WORK DEVICE

Floyd Drumm, Lansing, Mich., assignor to Ideal Power Lawn Mower Company, Lansing, Mich., a corporation of Michigan Application February 18, 1937, Serial No. 126,350

2 Claims. (Cl. 15—83)

This invention relates to power driven work devices, such as power brushes, power mowers, and the like. According to the preferred embodiment of the invention, a work unit including a rotatable work element is detachably connected to a traction unit, including a power drive having a driven connection with both the traction wheels of the traction unit and the rotatable work element of the work unit.

In one embodiment of the invention the work element includes a rotary brush arranged to clean the ground, pavement, floors, etc., the brushings being received by a hopper arranged in operative relation to the rotary brush. In another embodiment of the invention the work element includes a rotary brush, but in this embodiment the brush is arranged at an angle so that the brushings are delivered to one side of the work unit. In another embodiment of the invention the work element includes a grass cutting reel.

In its broader concept the present invention resides in the combination of a traction unit with a detachable work unit operatively associated therewith. More specifically, the invention resides in the details of construction of the work unit and the traction unit and the particular arrangement of these parts with respect to each other.

In the drawings:

Figure 1 is a perspective view of a power device embodying the present invention;

Figure 2 is a partial top plan view of the device shown in Figure 1;

Figure 3 is a sectional view taken on the line 3—3 of Figure 2;

Figure 7 is a perspective view of a power device embodying a modified form of the invention;

Figure 8 is a top plan view of the device shown in Figure 7;

Figure 9 is a fragmentary top plan view of the drive connection shown in Figure 7;

Figure 10 is a sectional view taken on substantially the line 10—10 of Figure 9;

Figure 11 is a partial side view of a power device embodying another modification of the invention; and Figure 12 is a fragmentary top plan view of the device shown in Figure 11.

Figure 5:
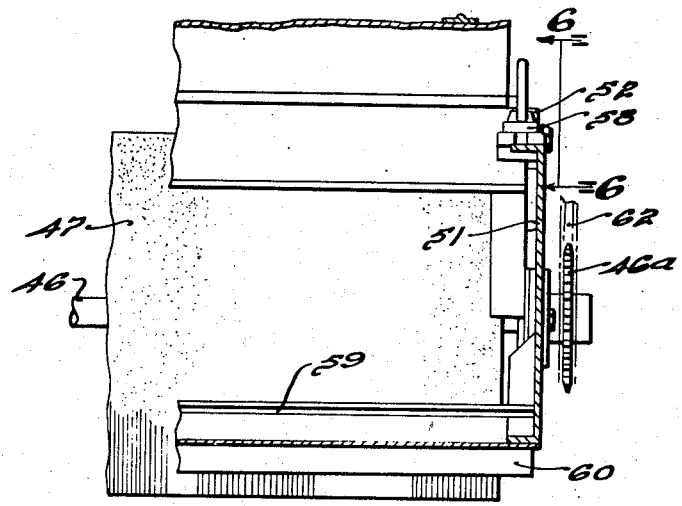
Figure 5 is a sectional view taken on the line 5—5 of Figure 2.

The power device shown in Figures 1 to 6 inclusive includes a traction unit generally designated by the reference numeral 10 and a work unit designated generally by the reference numeral 11. The traction unit 10 includes a frame 12 supported by a pair of traction wheels 13 and 14 and a trailer wheel 15. The traction wheels 13 and 14 are associated with an axle 16 to which the frame 12 is secured.

At its rear end adjacent the trailer wheel 15 the frame 12 is provided with a pair of guide handles 17 and 18 connected to the frame by the arms 19 and 20. The arms 19 and 20 are tied together by a cross member 21.

There are secured to the front of the frame 12 a pair of detachable brackets 22 and 23 which support a rod 24. Rod 24 is utilized in attaching the work unit 11 to the traction unit 10 in a manner which will be described presently.

The power unit 25, here shown in the form of an internal combustion engine, is mounted upon the frame 12. The power unit has projecting therefrom a drive shaft 26 which acts through clutch 27 to drive an auxiliary shaft 28 (see Figures 2 and 4). Shaft 28 terminates in a box 29. Mounted upon shaft 28 within the box 29 is a gear 30 meshing with a gear 31 secured to auxiliary drive shaft 32. Outwardly of the gear 30 shaft 28 is provided with a driving sprocket 33. Auxiliary shaft 32 is provided with a driving sprocket 34.

A differential spider 35, including a sprocket 36, is associated with wheel 13 and axle 16 in a conventional manner. The sprocket 36 is driven from driving sprocket 34 by chain 37. A clutch 38 is associated with axle 16 and traction wheel 14 in a conventional manner. Wheels 13 and 14 are thus driven from the power unit 25, the driving connection including the differential 35 and the clutch 38.

Clutch 27 associated with shaft 26 is actuated by lever 39 mounted upon the cross-tie 21 adjacent the guide handles 17 and 18. Lever 39 is operatively connected to the clutch by connecting rod 40. Clutch 38 associated with axle 16 and traction wheel 14 is actuated by a lever 41, also mounted upon the cross tie 21. Lever 41 is connected to clutch 38 by a connecting rod 42. The manner in which the clutches 27 and 38 are utilized to control the operation of the work device will be described presently.

The work unit 11 comprises a supporting frame and housing structure including the cross frame members 41 and 42 to which are secured a semi-cylindrical housing member 43 and a pair of end housing members 44. The end members 44 have mounted thereon bearings 45, which support a rotatable shaft 46. A rotary brush 47 is mounted upon shaft 46. The housing members 43 and 44 enclose the upper portion of the brush 47. The forward edge of the cyindrical housing member 43 is flanged as indicated at 48. A pair of connecting yokes 49 and 50 have their yoked extremities rigidly bolted to the cross frame members 41 and 42 of the work unit 11. The opposite extremities of the yokes 49 and 50 are pivotally connected to the rod 24 supported at the front end of the traction frame 12 by the brackets 22 and 23.

Figure 6:
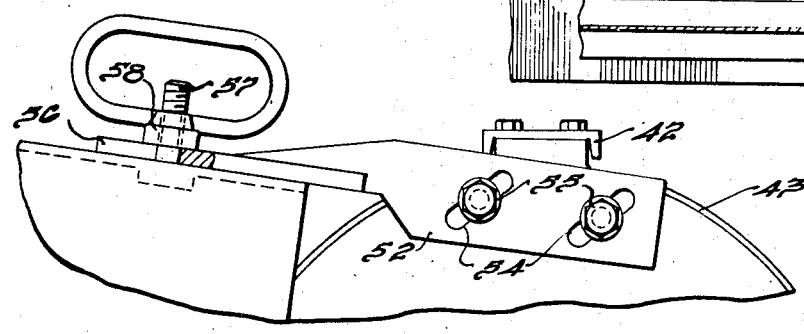
Figure 6 is a fragmentary side view taken on substantially the line 6—6 of Figure 5.
Figure 4:
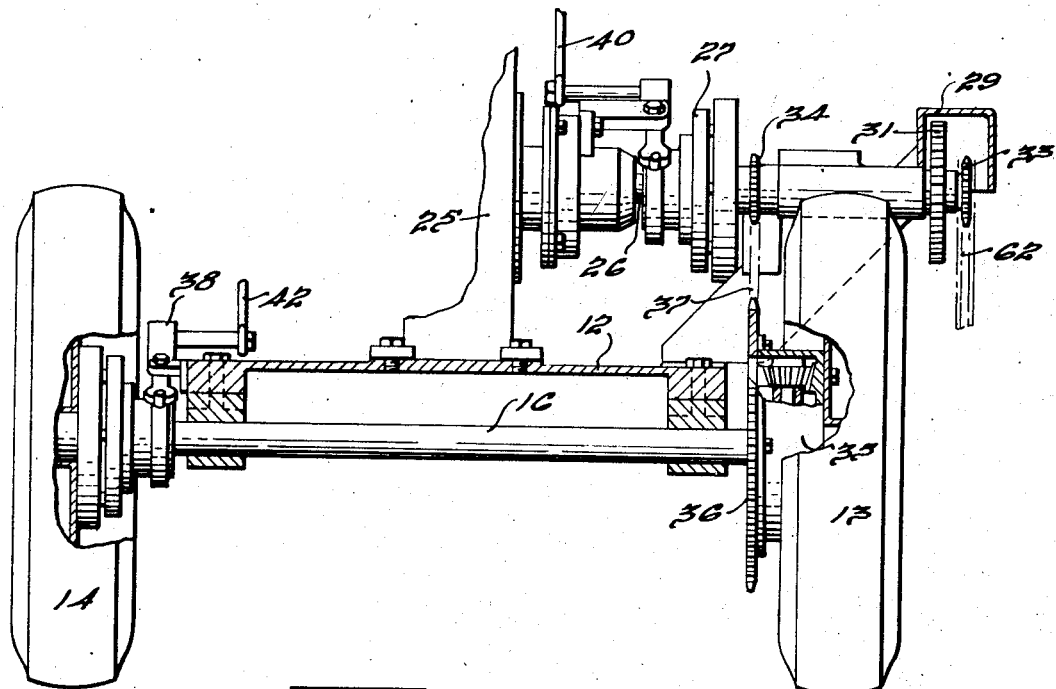
Figure 4 is a sectional view taken on the line 4—4 of Figure 2.

A hopper 51 is detachably secured to the work unit frame in operative relation to the brush 47 through brackets 52 and 53. These brackets are best shown in Figures 3 and 6. As there shown, they have an adjustable connection with the end members 44 through means of the elongated openings 54. The brackets 52 and 53 are secured to the end frame member of the work unit by means of securing bolt and nut assemblies 55, the bolts extending through elongated openings 54. The free ends of brackets 52 and 53 are slotted at 56, as shown in Figures 3 and 6, to receive a threaded stud 57 rigidly secured to the upper flanged edge of hopper 51. A nut 58 having a large handle attached thereto is threaded onto the free extremity of each of the studs 57.

When the nuts 58 are loosened upon the studs 57 the studs may be slid into or out of the slots 56 formed in the end of the brackets 52 and 53. When the studs are thus slid into the slots 56 and the nuts 58 tightened upon the studs 57, the hopper 51 is rigidly attached and becomes an integral part of the work unit. When the hopper 51 is removed from the brackets 52 and 53 the large hand grips associated with nuts 58 serve as a means for carrying the hopper.

The hopper 51 has an open face adjacent the brush 47, and is also open at the top. When installed as shown in Figures 1, 2 and 3, the hopper partially encloses the forward portion of the brush 47. The edge of the bottom of the hopper adjacent the open face is formed with a raised flanged portion 59 and a depending flexible skirt 60. The skirt is preferably formed of rubber, and projects beyond the edge of the hopper toward the brush. The sides of the hopper at points adjacent the flange 59 are also provided with retaining flanges 61 of limited width and height.

As best shown in Figures 1, 2 and 5, the brush supporting shaft 46 has secured to one end thereof exteriorly of the end member 44, a sprocket 46a. This sprocket is driven through a drive chain 62 by driving sprocket 33 mounted upon the drive shaft 28 and located within the gear guard box 29. Provision is made for maintaining drive chain 62 in operative engagement with both sprockets 46a and 33 through means of a chain tightener illustrated generally at 63.

It will be apparent from the description thus far that the arrangement of the parts is such that the rotary brush 47 is free to and does rest upon the surface which supports the traction wheels 13 and 14. Provision is made to swing the entire work unit 11, including the brush 47, about its pivotal axis, represented by the traction unit frame member 24. This is accomplished by means of a lever 64 having its lower end pivotally connected to shaft 24. The upper end of lever 64 is connected to cross frame member 42 of the work unit 11 by means of a chain 65. The upper end of lever 64 is connected to the traction unit 10 by means of a cable 66. The cable 66 is connected to the traction unit 10 through means of an operating lever 67 pivotally mounted upon the cross arm 21 adjacent guide handle 17. Operating lever 61 includes a conventional form of ratchet arrangement whereby the same may be located in a plurality of different positions. When lever 67 is moved in a clockwise direction the work unit 11 may be pivoted to a position where brush 47 is out of contact with the surface upon which the traction wheels 13 and 14 rest without removing the driving chain 62.

The operation of the work device shown in Figures 1 to 6 inclusive is as follows:

The device is propelled by the internal combustion engine 25 through its connection with traction wheels 13 and 14. These wheels are, of course, rotated in a counterclockwise direction by the driving chain 37. By reason of the gear arrangement previously described, brush 47 is rotated in a clockwise direction by the driving chain 62. Thus, as the entire work device is propelled forward, the brush 47 brushes its brushings into the hopper 51.

Power unit 25 may be disengaged from both the traction wheels and the rotary brush 47 by operation of clutch 27. As previously mentioned, this is done by means of the operating lever 39. The power unit 25 may be disengaged from the traction wheels 13 and 14 to stop the forward movement of the entire device by operation of the lever 41 which disengages clutch 38. By disengaging clutch 38 the traction wheels 13 and 14 are stopped, but the rotary brush 47 is not. The device may then be moved manually or held stationary while the brush 47 continues to rotate.

In order to accommodate brushings of different sizes or types of materials, the hopper 51 may be moved toward or away from the brush 47 so as to provide a narrower or wider space between the brush and the depending skirt 60 by adjusting the position of the supporting brackets 52 and 53. The position of the hopper may be adjusted to compensate for wear of the brush 47 by means of the adjustable connection between the brackets 52 and 53 and the end portions 44 of the brush housing.

The retaining flanges 59 and 61 formed adjacent the bottom of the hopper 51 about the open face thereof are adapted to prevent the brushings which are delivered to the hopper by the brush from dropping out of the hopper. By reason of the open top of the hopper, no back pressure is created against the brush 47 which would force the brushings out of the hopper around the sides thereof. In order to prevent the brushings from flying back into the face of the operator of the work device, there is provided over the top of the brush a shield 68 which is rigidly secured to cross frame member 42 by the supporting brackets 69 and 70.

The modified form of power device shown in Figures 7, 8, 9 and 10 is of the same general character as that shown in Figures 1 to 6 inclusive, namely, a power brush. In the present modification, however, the brush is at an angle so that the brushings are delivered to one side of the device, and the necessity for a hopper is thereby eliminated. The only changes in the power brush shown in Figures 7 to 10 inclusive over that shown in Figures 1 to 6 inclusive, are those made necessary by the character of the result achieved by the device. The power brush shown in Figures 7 to 10 inclusive is referred to herein as an angled brush, or side delivery type of power brush.

The work unit 11a for the angled brush device comprises a frame made up of the cross members 69 and 70, and the end members 71 secured thereto. End members 71 support bearings 72 in which is rotatably mounted a shaft 73 carrying rotary brush 47'. The supporting frame also includes a pair of yoked brackets or connecting arms 74 and 75, rigidly secured to cross members 69 and 70, and which cooperate to support a cross rod 76. The cross rod 76 is supported by the brackets 74 and 75, so as to be non-rotatable with respect thereto. It is through the rod 76 that the work unit 11a is pivotally connected to the traction unit 10a of Figure 7.

Two changes only are necessary in the traction unit 10 shown in Figures 1 to 6 inclusive in order to adapt it for use with the work unit 11a shown in Figures 7 and 8. One change is in the frame construction of the traction unit, and the other is in the construction and arrangement of the power drive connection with the power unit 25.

As clearly shown in Figure 8, the frame 12' of traction unit 10a is provided at its forward edge with an auxiliary frame 77 which takes the place of the supporting brackets 22 and 23 in the traction unit 10, as shown in Figure 10. The auxiliary supporting frame 77 is detachably connected to the frame 12' by bolt and nut assemblies 78. At its forward edge the auxiliary supporting frame 77 is provided with a cross supporting member 79 arranged diagonally with respect to the direction of travel of the traction unit. Cross supporting member 79 is provided with upright bearing brackets 80 and 81, which have a rotatable connection with rod 76 so that the work unit 11a may be pivoted about the axes of the aligned openings in the bearings 80 and 81.

Provision is made to pivot the work unit 11a in the manner just described so as to lift the brush 47' away from the ground or the other surface upon which the traction unit is supported. This is accomplished by means of a lever 82 secured to one end of rod 76 through a non-rotatable connection. The free extremity of lever 82 is connected to the adjustable operating lever 67' by connecting cable 66'. When the adjustable lever 67' is rotated in a clockwise direction the work unit 11a is pivoted away from the surface which supports the traction unit. It may be held in this position by the conventional ratchet mechanism associated with the adjustable lever 67'.

In order to assist in holding the work unit 11a in any predetermined position selected by adjustment of the lever 67', there is provided an auxiliary resilient support for the work unit consisting of the lever 83, the chain 84 and the spring 85. Lever 83 has one extremity rigidly secured to rod 76. Chain 84 has one extremity rigidly secured to cross frame member 69, and its other extremity secured to the lever 83. Spring 85 has one extremity secured to the lever 83 and its other end attached to the auxiliary supporting frame 77 through the connection indicated at 86.

The change in the power drive of traction unit 10 necessitated in order to accommodate that unit for use with the work unit 11a of the angled brush type, is best shown in Figures 9 and 10. As there shown, the auxiliary drive shaft 32 of Figure 2 is lengthened as indicated at 32' to accommodate an additional driving sprocket 87. The driving sprocket 87 is adapted to transmit driving power to the angled brush 47' through a drive chain 88 which drives a sprocket 89 associated with gear 90. Gear 90 meshes with gear 91, which has associated therewith a driving sprocket 92. A driving chain 93 operatively connects the driving sprocket 92 with a driven sprocket 94 rigidly secured to the shaft 73 which carries rotary brush 47'. The gears 90 and 91 are contained in a box 95 which is mounted upon the auxiliary supporting frame 77.

The angled brush power device of Figures 7 to 10 inclusive may be controlled so that the driving connection to the traction wheels is disengaged without disengaging the driving connection to the rotary brush 47'. This is accomplished by means of a clutch identical to that shown at 38 in Figure 2. Likewise, the driving connection to both the power brush 47' and the traction wheels may be disengaged by actuation of the clutch as indicated at 27'.

The modified form of device shown in Figures 11 and 12 is a power mower including a traction unit 10b and a work unit 11b pivotally and detachably connected to the traction unit. The traction unit 10b is substantially identical in all respects to the traction unit 10 shown in Figures 1 to 6 inclusive.

The work unit 11b includes side frame members 96 and 97 which support a rotatable shaft 98 upon which is mounted a cutting reel 99. Side frame members 96 and 97 are supported by a roller 99a and a wheel 100. A pair of generally L-shaped connecting arms 101 and 102 are rigidly secured to the side frame members 96 and 97. The longer legs of the connecting arms 101 and 102 are pivotally connected to the cross rod 24" supported at the forward end of the traction unit 10b by the brackets 22" and 23".

Outwardly of the side frame member 96 there is secured to the drive shaft 98 a driving sprocket 103. Driving sprocket 103 is driven through chain 104 by driving sprocket 105 associated with drive shaft 32". It will, of course, be understood that the driving sprocket 105 is mounted upon the shaft 32" within the box 29" and is adapted to rotate the reel shaft 98 in a counter-clockwise direction. In other words, the cutting reel of work unit 11b is driven in the same rotary direction as are the traction wheels of the traction unit 10b. In this respect the present modification differs from the previously described modifications.

Work unit 11b is adapted to be disengaged from the surface upon which it operates in the same manner as the work unit 11 of Figures 1 to 6, inclusive, namely, by being pivoted about the cross rod 24". To this end the shorter legs of the connecting arms 101 and 102 support a lifting rod 106. Lifting rod 106 is connected to the upper end of lever 64" by a chain 107. The lower extremity of lever 64" is pivotally connected to the cross rod 24". The upper extremity of lever 64" is also connected by a cable 66" with an operating lever associated with the guide handles of the traction unit 10b. By suitable adjustment of the operating lever the work unit 11b may be pivoted about the rod 24" so as to lift it away from the ground or other surface upon which it rests when in operative position. This disengagement of the work unit 11b from the working surface may be effected without removing the driving chain 104.

From the foregoing description it will be apparent that this invention provides a novel form of power actuated device consisting of a traction unit and a work unit (of various kinds) operatively and detachably connected to each other. While only certain illustrative embodiments of the invention have been herein shown and described, it will be readily appreciated that the invention may be embodied in other specific forms of structure. The scope of the invention is indicated by the appended claims.

I claim:

1. A device of the character described, comprising a traction unit frame including a guide handle, a work unit frame arranged in spaced relation to the traction unit frame, a connecting arm rigidly secured to one end of the work unit frame and pivotally secured to the adjacent end of the traction unit frame, an adjustable connecting means associated with the work unit frame and the guide handle for maintaining the work unit frame in a plurality of its pivotal positions with respect to the traction frame, said adjustable means including a fulcrum lever pivotally secured to the traction unit frame, an operating lever mounted upon the guide handle, means connecting the free end of the fulcrum lever to the operating lever, and means connecting the free end of the fulcrum lever to the work unit frame.

2. In a device of the character described, a work unit adapted to be propelled in front of and by a traction unit, comprising a frame, a pair of horizontally disposed arms connected to the frame for vertical adjustment with respect thereto, a hopper, and means connecting the hopper to said arms in a plurality of positions longitudinally of said arms.

FLOYD DRUMM.